Oct. 31, 1939. P. NOLAN 2,178,211
OPTICAL APPARATUS
Filed April 23, 1937 2 Sheets-Sheet 1
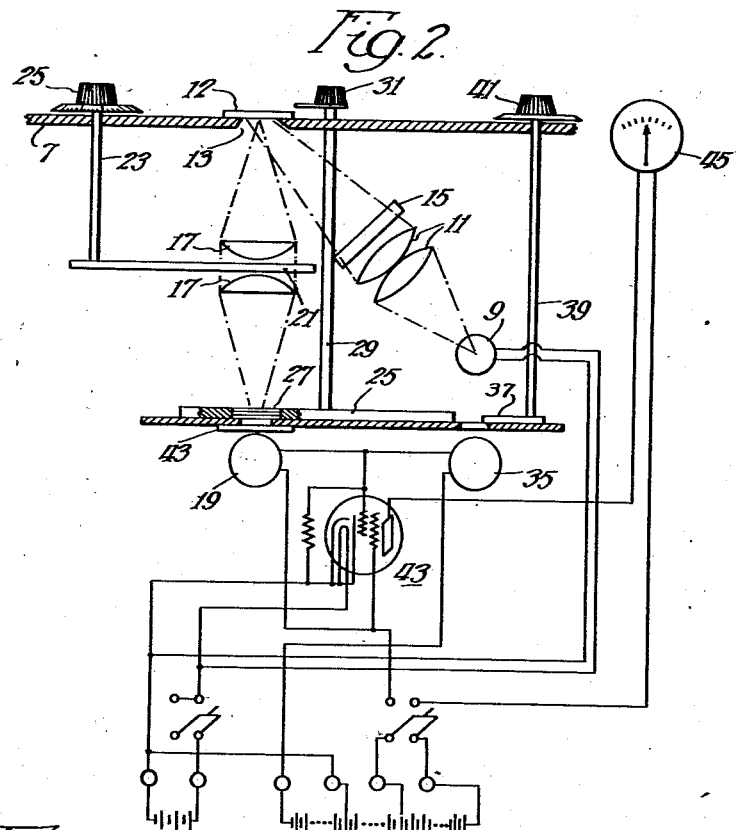
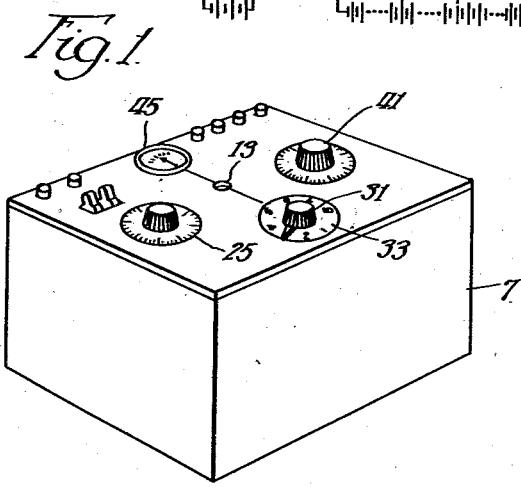
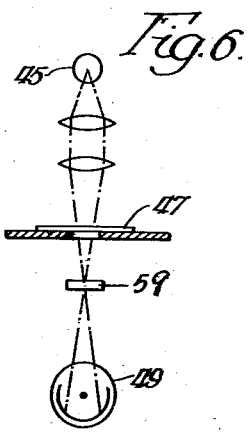
Inventor
Philip Nolan Oct. 31, 1939. P. NOLAN 2,178,211
OPTICAL APPARATUS
Filed April 23, 1937 2 Sheets-Sheet 2
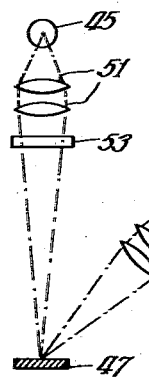
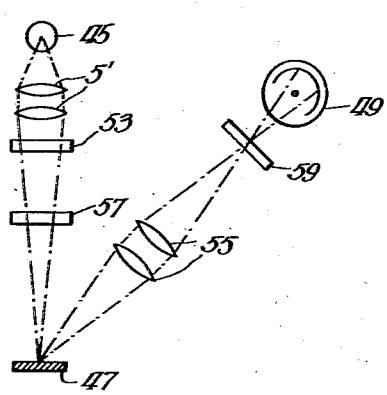
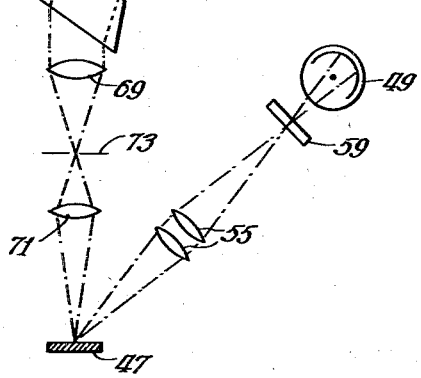
Inventor
Philip Nolan Patented Oct. 31, 1939

2,178,211

UNITED STATES PATENT OFFICE 2,178,211

OPTICAL APPARATUS

Philip Nolan, Appleton, Wis., assignor to The Institute of Paper Chemistry, Appleton, Wis., a corporation of Wisconsin Application April 23, 1937, Serial No. 138,484

6 Claims. (Cl. 88—14)

My invention relates to the general art of optics and has particular reference to instruments for use in performing color analysis measurements.

In the manufacture and coloring of paper, cloth, wrappings, and films of various types, there is a great need for apparatus which is capable of performing rapid and accurate color analysis, preferably without necessitating extensive or elaborate calculations. Not only is this important in the matching and duplicating of colors, but also in the maintenance of color standards during manufacturing and coloring operations.

For ordinary opaque or semi-opaque materials color is, of course, a function of the absorption and reflectance characteristics of the material, and color analyzers for such materials are generally of the reflectance type, that is to say, they operate by making possible the determination of the relative reflectance of visible light of the material. The usual instrument includes means for directing a standardized beam of light upon the surface of the sample to be tested, and means for measuring the intensity of the reflected light and for comparing that intensity with the intensity of light reflected from a standard of reflectance.

The most accurate results are obtained by making a large number of reflectance measurements for monochromatic light of the different wave lengths encountered in the visible spectrum, and apparatus capable of performing such measurements are generally termed "spectrophotometers". Some spectrophotometers utilize a beam of monochromatic light, and others monochromatize the reflected light prior to the measurement of the intensity thereof. The curve of spectral reflectance yields, of course, a complete analysis of the color reflectance characteristics of a material and constitutes the best known determination of the color reflectance characteristics possible.

The ordinary type of spectrophotometer used in testing laboratories is manually operable, although automatically operable instruments have been developed. The attaining of a curve of spectral reflectance by the use of a manually operable instrument is a slow and tedious process requiring considerable skill in the operator and extensive calculations. While these difficulties are overcome in the automatic device, the cost of such instruments is very great, and they will produce satisfactory results only in the hands of unusually skilled and highly experienced operators.

There is a real need, therefore, for a simple, low cost instrument which can be operated by individuals of ordinary skill and training, and to meet this need, simple, easily operated apparatus has been developed for measuring color reflectance at a number of selected wave lengths spaced over the visible spectral range believed capable of giving representative readings. The apparatus is generally similar to a spectrophotometer in that a beam of light is directed upon the sample under test and measurement made of the energy of the reflected light at predetermined wave lengths. Photo-cell equipment in the measuring side of the apparatus permits direct reading of the reflected light energy. Usually readings for some eight or ten wave lengths or bands of wave lengths are taken, and the results obtained by certain of these devices have indicated that a satisfactory solution of the problem may lie along this line. Tests indicate, however, that these photo-cell analyzers which measure reflectance at selected wave lengths suffer from some fundamental defect which seriously impairs their accuracy, and the indicated results obtained by their use differ sometimes as much as 60% from the true spectral reflectance of a material as determined by a spectrophotometer using monochromatic light.

The present invention is concerned with overcoming this fundamental inaccuracy of these photo-cell color analyzers described above, and reduced to its simplest elements consists in the discovery that the introduction of an infra-red blocking filter into the measuring side of the analyzer will almost completely overcome the difficulties experienced with the prior art devices. In fact, devices equipped with the blocking filter of the present invention are capable of performing color analyses for a large number of samples comparable in results with those obtained by spectrophotometers without requiring more than about eight or ten reflectance readings for selected wave lengths of light such as are obtainable by narrow band filters. The discovery, while yielding a relatively simple solution to the problem, is of tremendous value to the art, in that it permits accurate and rapid color analysis by the use of simple, easily operated equipment. Further, the discovery has application not only to photo-cell reflectance type color analyzers, but also to photo-cell analyzers for measuring the spectral transmission of transparent materials such as colored glass, colored films, colored solutions, and the like.

In the accompanying drawings I have illustrated certain apparatus to which the present invention has particular application. Referring to these drawings:

Figure 1 is a perspective view of one of the simpler forms of photo-cell, reflectance type color analyzers in current use;

Figure 2 is a schematic view of the device illustrated in Figure 1 and illustrates the mechanical, electrical, and optical features thereof; and Figures 3 to 6 are schematic views illustrating the essential features of the optical systems of various photo-cell instruments of the general class whose accuracy will be improved by the embodiment therein of the present invention.

The apparatus illustrated in Figures 1 and 2 includes a box-like closure 7 and means such as a tungsten filament bulb 9 and a condensing lens system 11 for directing a concentrated beam of light onto a test sample 12 of the material being tested, which sample is positioned over a suitable opening 13 in the closure 7 of the device. An infra-red filter 15 usually of the copper sulphate type is interposed in the optical system of this beam for preventing heating of the sample. The reflected light from the sample is collected by a second condensing lens system 17 and focused upon a photo-cell indicated at 19. A sector diaphragm 21 adapted to be operated by a shaft 23 and a calibrated dial 25 is arranged in the measuring side of the optical system, and the reflected beam passes through a filter wheel 25 having a plurailty of narrow band filters, one of which is indicated at 27, arranged over suitable openings therein. About nine filters are usually sufficient for most commercial work. The filter wheel 25 is operated to bring each filter into position by a shaft 29 and knob 31, the knob 31 having a pointer for cooperating with a suitably marked indicator scale 33.

The device includes a second photo-cell 35 arranged to receive light from the light source 9, and a compensator 37, actuable by a shaft 39 and calibrated dial 41, is provided for controlling the amount of light energy impinging upon the photo-cell 35. The compensator 37 is used only during the standardizing of the apparatus. The two photo-cells 19 and 35 operate in conjunction with a vacuum tube amplifier 43 and a galvanometer instrument 45.

During the operation of this device a sample of the material to be tested is placed over the sample opening 13 in the closure 7, the sector diaphragm 21 is adjusted to the known reflectance value of the standard (which will subsequently be placed over the sample opening 13) for the particular filter in place in the measuring side of the instrument, and the compensator 37 is then operated to bring the needle of the meter 45 to an arbitrary reference point other than zero. The device is then ready to measure reflectance, the operation consisting in the placing of the standard in the position previously occupied by the sample, which act is followed by adjustment of the diaphragm 21 to restore the meter needle to the reference point. A direct reading of the relative reflectance for the light passed by the filter then in place may be obtained from the calibrated scale forming a part of the diaphragm control dial 25. Other readings involving the same two step procedure outlined above are then made for as many of the other filters as is believed necessary.

The diaphragm readings thus obtained represent a balancing of the light energy received by the two photo-cells 19 and 35 and give a reading indicative of the reflectance of the sample for the particular light passed by the narrow band filter. As mentioned previously, comparative tests show that the curves of spectral reflectance obtained by instruments of this type often differ very materially from the curves obtained by a complete spectral reflectance examination made by a spectrophotometer using monochromatic light. If, however, an infra-red blocking filter capable of passing the light in the visible spectrum with minimum diminution thereof is introduced into the optical system of the measuring side of the apparatus, as indicated at 43 in Figure 2, it will be found that these discrepancies will disappear and a curve of spectral reflectnce based upon the reflected light transmitted by a relatively small number of narrow band filters will give results coinciding almost exactly with the true curve of spectral reflectance obtained by complete monochromatic examination of the sample in a spectrophotometer.

Certain other forms of optical measuring equipment, the fundamental accuracy of which may also be improved by the introduction of an infra-red blocking filter in the measuring side of the apparatus, are illustrated in Figures 3 to 6. In these figures a light source is indicated at 45, the sample at 47, and light measuring equipment, which may be of the photo-electric type, is indicated at 49.

In the device illustrated in Figure 3, light from the light source 45 is concentrated into a beam by condensing lenses 51 and directed upon the sample 47. An infra-red filter for preventing heating of the sample is introduced into this beam at 53. The reflected light is concentrated and directed into the photo-cell or other measuring equipment 49 by a second set of condensing lenses 55. In the ordinary operation of these devices, a narrow band filter is introduced into the measuring circuit at 57, and if this is all that is done, the device will display the same fundamental inaccuracy of the structures previously mentioned. If, however, the infra-red blocking filter of the present invention is introduced into the measuring circuit between the narrow band filter 57 and the photo-cell 49, as at 59, these inaccuracies will be overcome. It should be noted that the positioning of the infra-red blocking filter 59 is important, if it is located on the other side of the narrow band filter complete realization of the desired improvement in accuracy will not be accomplished. This arrangement is, of course, generally similar to the apparatus illustrated in Figures 1 and 2.

The device illustrated in Figure 4 is similar to the device illustrated in Figure 3 except that the narrow band filter 57 is introduced into the light source side thereof. As in the previously described apparatus, despite the fact that the reflected light apparently should be of the same wave length as that passed by the filter, serious inaccuracy in the results is noted, and this inaccuracy may be overcome by the use of an infra-red blocking filter in the measuring side, as indicated at 59. In devices of this type, the desired improvement in accuracy will be accomplished by introducing the blocking filter at any point in the optical system of the measuring side of the device.

The device illustrated in Figure 5 employs a source of monochromatic light produced by means of condensing lenses 61, a variable width slit 63, a collimating lens 65, a constant deviation prism 67, objective and condensing lenses 69 and 71, and a second slit 73 of variable width.

This device, like those previously described, also fails to give readings accurately representative of the true spectral reflectance of the sample unless the infra-red filter of the present invention is introduced into the optical system of the measuring side of the equipment, as indicated at 59. It is noted that the magnitude of the errors in the readings for the device in Figure 5 are likely to be smaller than those observed for the previously described devices.

Improvement in the fundamental accuracy of instruments for measuring the spectral transmittance of relatively transparent materials, particularly those wherein the measuring equipment is not arranged to measure solely the parallel transmittance of the sample, is also accomplished by the introduction of the infra-red filter of the present invention into the measuring side of the optical system. A device of this type is illustrated schematically in Figure 6, the infra-red blocking filter indicated at 59 being introduced into the optical system of the measuring side of the instrument adjacent the photo-cell 49.

Any infra-red filter which is capable of passing a high percentage of the visible light energy and at the same time is capable of blocking out substantially all of the infra-red light having a wave length in excess of 700 millimicrons may be used with good results in the carrying out of the present invention. The filter manufactured by the Schott and Gen. Glass Works, Jena, Germany, and marketed under the trade name of "Jena BG-18" is particularly suitable for this purpose. This filter has a reasonably high percentage transmission between the range of 400 to 600 millimicrons and blocks out substantially all infra-red energy having a wave length between 700 and 1300 millimicrons.

It is a well known fact that the spectral reflectance of any particular material is to some extent dependent upon the angle at which the reflectance measurement is made. This fact, however, seems to have little, if any, influence upon the improvement in the fundamental accuracy of reflectance measurements made possible by the present invention, and it is reasonable to conclude that the introduction of an infra-red filter in the measuring side of all photo-cell equipment for color analysis or like purposes will accomplish very substantial improvement in the fundamental accuracy of those devices. Tests on many types of instruments, representative of various practices in the art, indicate the correctness of this conclusion.

The importance of the invention, in making possible the determination of accurate curves of spectral reflectance by the measurement of the relative reflectance of the sample under test by measurements based on only a few selected wave lengths or bands of wave lengths such as are readily attainable by the narrow band filters known to the art, is obvious. As mentioned previously, photo-cell color analyzers have been developed for automatic operation. These devices will enjoy similar improvement in accuracy to that previously described when the present invention is embodied therein.

It will be apparent to those skilled in the art that the broad principle which has been disclosed in the foregoing is applicable to many types of photo-cell color analyzing and measuring equipment.

I claim the following as my invention:

1. In a device for measuring spectral reflectance in the visible light range, means for directing a beam of light of predetermined wave length range onto a test sample, means for measuring the intensity of the visible light within said predetermined wave length range which is reflected from said sample, and an infra-red blocking filter arranged in the optical system of said measuring means which prevents infra-red light only from reaching said measuring means.

2. In a device for measuring spectral reflectance in the visible light range, means for directing a beam of visible light onto a test sample, means including a filter and a photo-cell for measuring the intensity of the visible light within a predetermined wave length range which is reflected from the test sample and passed by said filter, and an infra-red blocking filter arranged in the optical system of said measuring means which prevents infra-red light only from reaching said photo-cell.

3. In a device for measuring spectral reflectance in the visible light range, means including a prism for directing a beam of monochromatic visible light onto the material being tested, means including a photo-cell for measuring the intensity of the monochromatic light reflected from said material, and an infra-red blocking filter arranged in the optical system of said measuring means which prevents infra-red light only from reaching said measuring means.

4. In a device for measuring spectral reflectance in the visible light range, means for directing a concentrated beam of visible light onto a test sample, means including a condensing lens, a filter, and a photo-cell for measuring the intensity of the visible light within a predetermined wave length range which is reflected from the test sample, and an infra-red blocking filter arranged in the optical system of said measuring means intermediate said photo-cell and the other elements of said measuring means which filter prevents infra-red light only from reaching said measuring means.

5. In a device for measuring spectral reflectance in the visible light range, a source of light, means for directing a concentrated beam of light from said source onto a test sample, a photo-cell arranged to be directly energized from said light source, a second photo-cell, means including a condensing lens and a filter for collecting the light reflected from the test sample and for directing the light collected and passed by said filter onto said second photo-cell, a variable area diaphragm arranged to control the intensity of the light falling upon said second photo-cell, a blocking filter which passes visible light but blocks infra-red light arranged intermediate said second photo-cell and said filter forming a part of said light directing means, and means, including an electrical indicating means, cooperating with said photo-cells to permit measurement of the relative intensity of the light energy falling upon said photo-cells by varying the area of said diaphragm.

6. In a device for measuring spectral reflectance in the visible light range, means for directing a beam of light of predetermined wave length range onto a test sample, an infra-red blocking filter positioned in said beam for preventing infra-red light from impinging upon the test sample, means including a photo-cell for measuring the intensity of the light reflected by the sample, and a second infra-red blocking filter located in the optical system of said measuring means intermediate said photo-cell and the sample which prevents infra-red light only from reaching said photo-cell.

PHILIP NOLAN.